(12) United States Patent
Bouchard et al.

(10) Patent No.: US 9,200,537 B2
(45) Date of Patent: *Dec. 1, 2015

(54) GAS TURBINE EXHAUST CASE WITH ACOUSTIC PANELS

(75) Inventors: Richard Bouchard, Sorel-Tracy (CA); Gaetan Girard, Outremont (CA); Christian Pronovost, Boucherville (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 1027 days.

This patent is subject to a terminal disclaimer.

(21) Appl. No.: 13/292,277

(22) Filed: Nov. 9, 2011

(65) Prior Publication Data

US 2013/0115051 A1     May 9, 2013

(51) Int. Cl.
```
F01D 25/06      (2006.01)
F01D 25/04      (2006.01)
F02C 7/20       (2006.01)
F02C 7/045      (2006.01)
F01D 25/16      (2006.01)
F02K 1/82       (2006.01)
```

(52) U.S. Cl.
CPC ............... *F01D 25/162* (2013.01); *F02C 7/20* (2013.01); *F02K 1/827* (2013.01); *Y10T 29/49323* (2015.01)

(58) Field of Classification Search
CPC ............... F02C 7/00; F02C 7/08; F02C 7/20; F02C 7/045; F01D 25/04; F01D 25/06; F02K 1/827; B64D 2027/262; B64C 23/04; G10K 11/172
USPC ............ 60/796, 797, 798; 415/119, 196, 197; 181/213, 222
See application file for complete search history.

(56) References Cited

U.S. PATENT DOCUMENTS

| | | | |
|---|---|---|---|
| 2,681,788 A | 6/1954 | Wosika |
| 3,028,141 A | 4/1962 | Nichols |
| 3,071,346 A | 1/1963 | Broffitt |
| 3,511,577 A | 5/1970 | Karstensen |
| 3,730,292 A | 5/1973 | MacDonald |
| 4,077,206 A | 3/1978 | Ayyagari |
| 4,106,587 A | 8/1978 | Nash et al. |

(Continued)

FOREIGN PATENT DOCUMENTS

| | | |
|---|---|---|
| EP | 1849987 A2 | 10/2007 |
| GB | 608236 | 6/2006 |

OTHER PUBLICATIONS

Broszat, Dominik et al., "Validation of an Integrated Acoustic Absorber in a Turbine Exit Guide Vane", American Institute of Aeronautics and Astronautics/CEAS Aeroacoustics Conference, Jun. 5-8, 2011, Portlant Oregon, p. 1-7.

*Primary Examiner* — William H Rodriguez
*Assistant Examiner* — Eric Linderman
(74) *Attorney, Agent, or Firm* — Norton Rose Fulbright Canada LLP

(57) ABSTRACT

A turbine exhaust case for a gas turbine engine has an outer shroud and an inner shroud concentrically defining therebetween an annular gaspath for channelling hot gases. A plurality of circumferentially spaced-apart turbine exhaust struts extends radially across the hot gaspath. The inner shroud may be provided in the form of an acoustic panel. The acoustic panel has a radially outwardly facing surface defining the radially inner flow boundary surface of the gaspath. The acoustic panel is mechanically fastened to the radially inner end of the struts.

17 Claims, 4 Drawing Sheets

(56) References Cited

U.S. PATENT DOCUMENTS

| | | | |
|---|---|---|---|
| 4,137,992 A * | 2/1979 | Herman | 181/213 |
| 4,226,297 A | 10/1980 | Cicon | |
| 4,240,252 A | 12/1980 | Sargisson et al. | |
| 4,298,090 A * | 11/1981 | Chapman | 181/286 |
| 4,335,573 A | 6/1982 | Wright | |
| 4,384,822 A | 5/1983 | Schweikl et al. | |
| 4,391,565 A | 7/1983 | Speak | |
| 4,433,751 A | 2/1984 | Bonneau | |
| 4,639,189 A | 1/1987 | Rosman | |
| 4,756,153 A | 7/1988 | Roberts et al. | |
| 4,889,469 A | 12/1989 | Wilkinson | |
| 4,907,946 A * | 3/1990 | Ciokajlo et al. | 415/209.3 |
| 4,926,963 A | 5/1990 | Snyder | |
| 4,947,958 A | 8/1990 | Snyder | |
| 4,989,406 A | 2/1991 | Vdoviak et al. | |
| 5,060,471 A | 10/1991 | Torkelson | |
| 5,167,118 A | 12/1992 | Torkelson | |
| 5,269,651 A | 12/1993 | Ostermeir et al. | |
| 5,357,744 A * | 10/1994 | Czachor et al. | 60/799 |
| 5,594,216 A * | 1/1997 | Yasukawa et al. | 181/213 |
| 5,653,580 A | 8/1997 | Faulder et al. | |
| 5,715,672 A | 2/1998 | Schockemoehl et al. | |
| 5,908,159 A | 6/1999 | Rudolph | |
| 5,919,029 A | 7/1999 | Van Nostrand et al. | |
| 5,943,856 A | 8/1999 | Lillibridge et al. | |
| 6,012,281 A | 1/2000 | Hauser | |
| 6,263,998 B1 | 7/2001 | Schockemoehl et al. | |
| 6,547,518 B1 | 4/2003 | Czachor et al. | |
| 6,584,766 B1 | 7/2003 | Czachor | |
| 6,672,424 B2 | 1/2004 | Gadefait et al. | |
| 6,804,948 B2 | 10/2004 | Oishi | |
| 7,000,406 B2 | 2/2006 | Markarian et al. | |
| 7,100,358 B2 * | 9/2006 | Gekht et al. | 60/39.5 |
| 7,246,995 B2 | 7/2007 | Zborovsky | |
| 7,337,875 B2 | 3/2008 | Proscia et al. | |
| 7,552,796 B2 | 6/2009 | Baarck et al. | |
| 7,604,095 B2 | 10/2009 | Mitchell | |
| 7,762,057 B2 | 7/2010 | Sloan et al. | |
| 7,784,283 B2 | 8/2010 | Yu et al. | |
| 7,819,224 B2 | 10/2010 | Borchers et al. | |
| 7,836,702 B2 | 11/2010 | Grivas et al. | |
| 7,886,543 B2 | 2/2011 | Vincent | |
| 7,891,195 B2 | 2/2011 | Bouty et al. | |
| 7,950,236 B2 | 5/2011 | Durocher et al. | |
| 7,954,596 B2 | 6/2011 | Schulze et al. | |
| 8,136,362 B2 * | 3/2012 | Beutin et al. | 60/796 |
| 2002/0036115 A1 * | 3/2002 | Wilson | 181/292 |
| 2006/0010852 A1 | 1/2006 | Gekht et al. | |
| 2006/0060421 A1 * | 3/2006 | Sarin et al. | 181/290 |
| 2007/0251212 A1 | 11/2007 | Tester | |
| 2011/0108357 A1 * | 5/2011 | Vauchel et al. | 181/222 |
| 2011/0126544 A1 * | 6/2011 | Foster | 60/752 |
| 2011/0167785 A1 | 7/2011 | Moore et al. | |
| 2011/0167786 A1 | 7/2011 | Marques et al. | |
| 2012/0006614 A1 | 1/2012 | Todorovic | |
| 2013/0111906 A1 * | 5/2013 | Bouchard et al. | 60/694 |
| 2013/0115076 A1 * | 5/2013 | Bouchard et al. | 415/213.1 |

* cited by examiner

GAS TURBINE EXHAUST CASE WITH ACOUSTIC PANELS

TECHNICAL FIELD

The application relates generally to gas turbine engines and, more particularly, to a gas turbine exhaust case of a turbofan engine.

BACKGROUND OF THE ART

Acoustic panels typically comprise a honeycomb core layer trapped between a solid bottom skin and an upper skin. The upper skin is typically perforated with a plurality of acoustic holes to trap the sound in the alveolar cells of the honeycomb material. Accordingly, for the acoustic panels to perform satisfactorily, obstruction or contamination of the acoustic holes should be avoided. This might be challenging when the acoustic panels have to be integrated to an engine structure which necessitates the panels to be exposed to manufacturing processes, such as welding and machining. There is always a risk that some of the acoustic holes become clogged or contaminated as a result of being exposed to such subsequent manufacturing processes. Cleaning the panels afterwards can be challenging. Accordingly, the integration of acoustic panels in certain areas of gas turbine engines is still relatively limited.

SUMMARY

In one aspect, there is provided a turbine exhaust case for a gas turbine engine having an axis, the exhaust case comprising a radially outer annular shroud and a radially inner annular shroud concentrically mounted about said axis and defining therebetween an annular gaspath for channelling hot gases received from a turbine section of the engine, a plurality of circumferentially spaced-apart struts extending radially across the gaspath between the radially outer and the radially inner annular shrouds, at least one of said radially inner and outer shrouds being defined by at least one arcuate acoustic panel, said at least one arcuate acoustic panel having a radially facing surface defining a flow boundary surface of said gaspath, said at least one acoustic panel having an array of circumferentially spaced-apart fastener receiving holes extending thicknesswise therethrough, each of said fastener receiving holes being aligned with a corresponding connection hole defined in an end wall of an associated one of said struts, and a plurality of fasteners projecting radially from said fastener receiving holes of said at least one acoustic panel into said connection holes of said struts, the fasteners structurally connecting the struts to said at least one acoustic panel.

In a second aspect, there is provided a turbine exhaust case for a turbofan engine having an axis, the exhaust case comprising a radially outer annular shroud and a radially inner annular shroud concentrically mounted about said axis and defining therebetween an annular gaspath for channelling hot gases received from a turbine section of the engine, a plurality of circumferentially spaced-apart turbine exhaust struts extending radially across the gaspath between the radially outer and the radially inner annular shrouds, the radially inner shroud being defined by at least one arcuate acoustic panel, said at least one arcuate acoustic panel having a radially outwardly facing surface defining a radially inner flow boundary surface of said gaspath, said exhaust struts projecting radially outwardly from said radially outwardly facing surface of the at least one acoustic panel and being mechanically fastened at their radially inner ends to said at least one acoustic panel.

In a third aspect, there is provided a method of manufacturing a turbine exhaust case comprising: a) providing a radially outer annular shroud, b) structurally mounting a circumferential array of struts to a radially inwardly facing surface of the radially outer shroud, and then c) mechanically fastening individual acoustic panels to a radially inner end of the struts, the acoustic panels collectively forming a circumferentially segmented radially inner annular shroud.

DESCRIPTION OF THE DRAWINGS

Reference is now made to the accompanying figures, in which.

DETAILED DESCRIPTION

Figure 1:
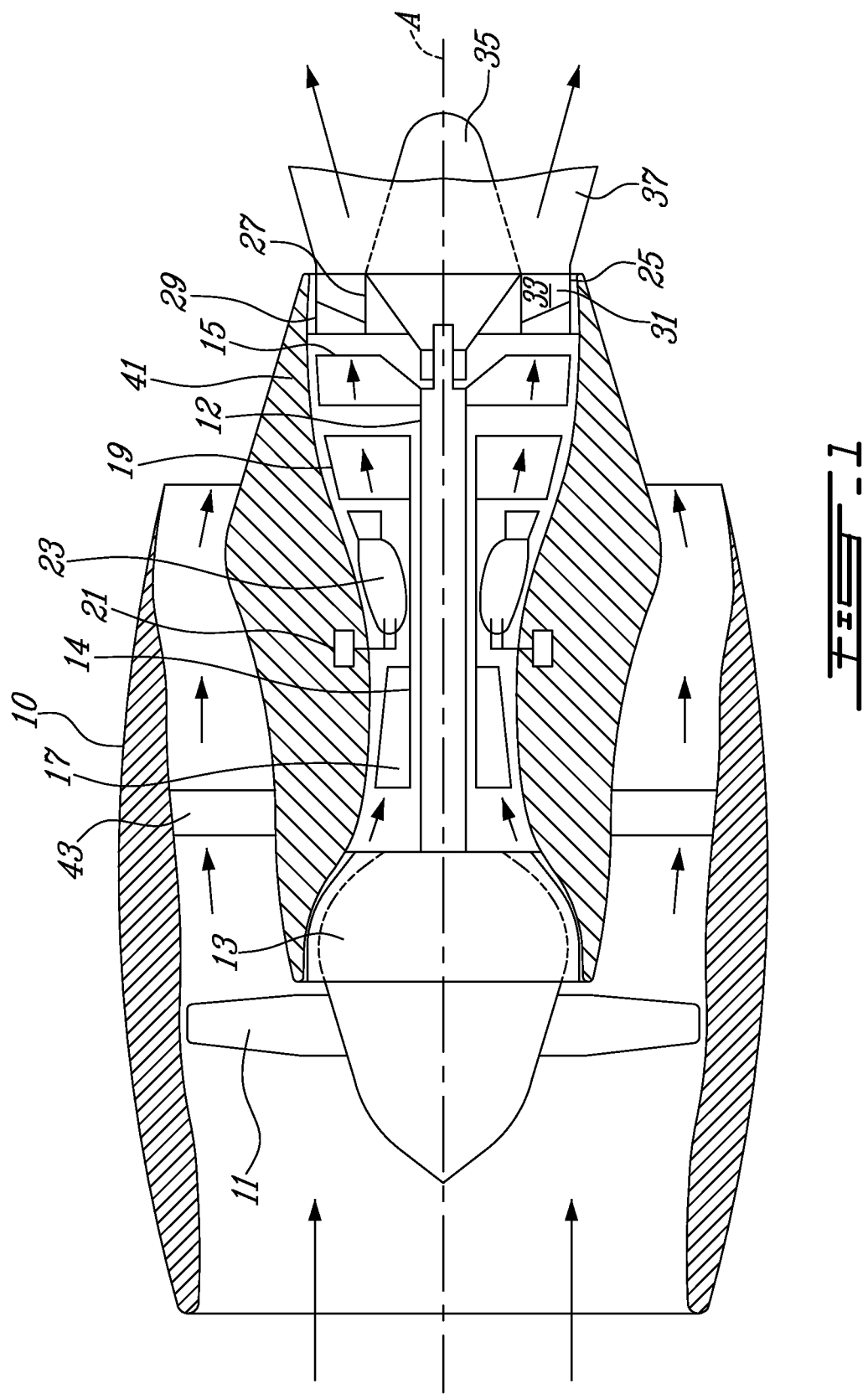
FIG. 1 is a schematic cross-section view of a turbofan gas turbine engine.

FIG. 1 illustrates an example of a turbofan gas turbine engine generally comprising a housing or nacelle 10; a low pressure spool assembly 12 including a fan 11, a low pressure compressor 13 and a low pressure turbine 15; a high pressure spool assembly 14 including a high pressure compressor 17, and a high pressure turbine 19; and a combustor 23 including fuel injecting means 21.

Figure 2:
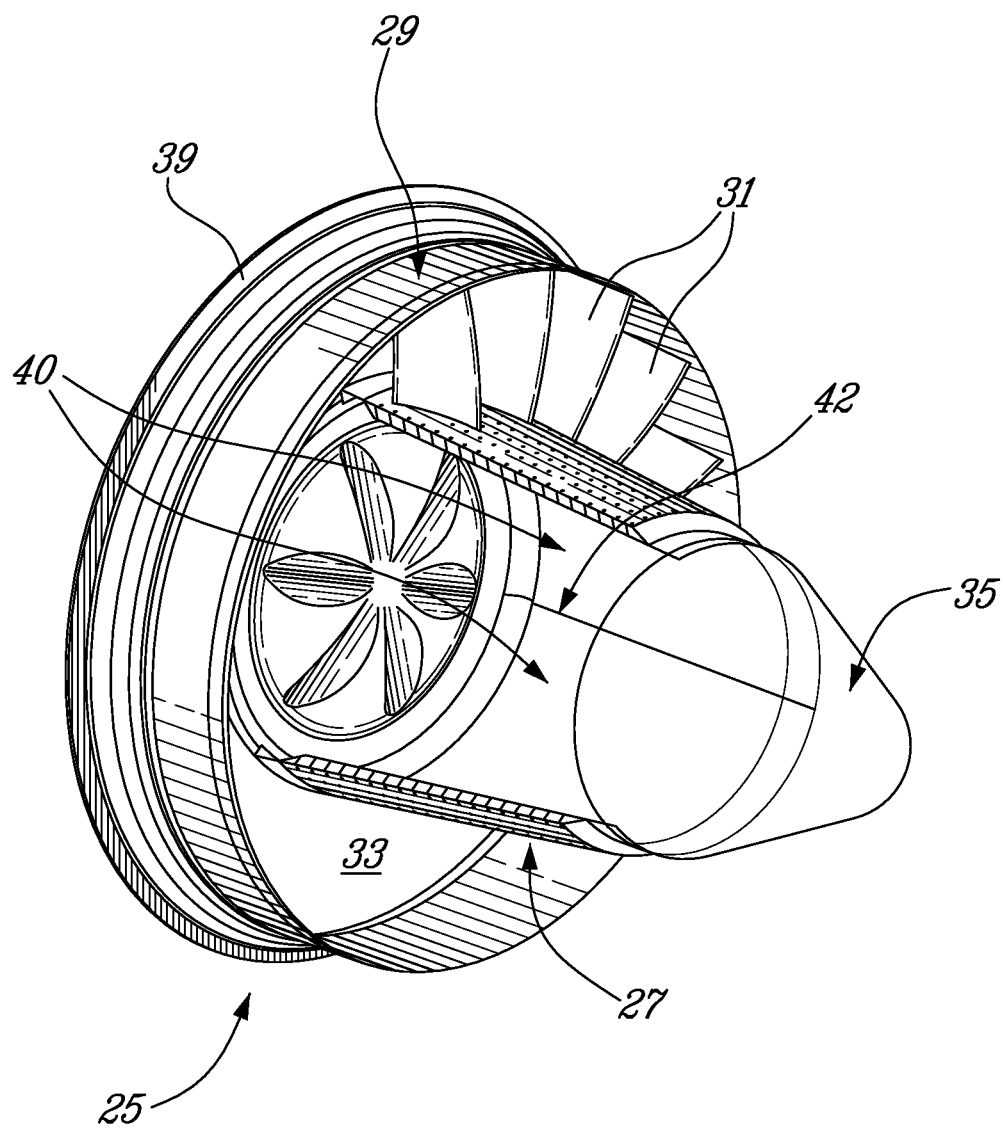
FIG. 2 is an isometric view of a turbine exhaust case, the mixer typically attached to the outer shroud of the case as well as one circumferential segment of the inner shroud of the exhaust case being omitted for clarity purposes.
Figure 3:
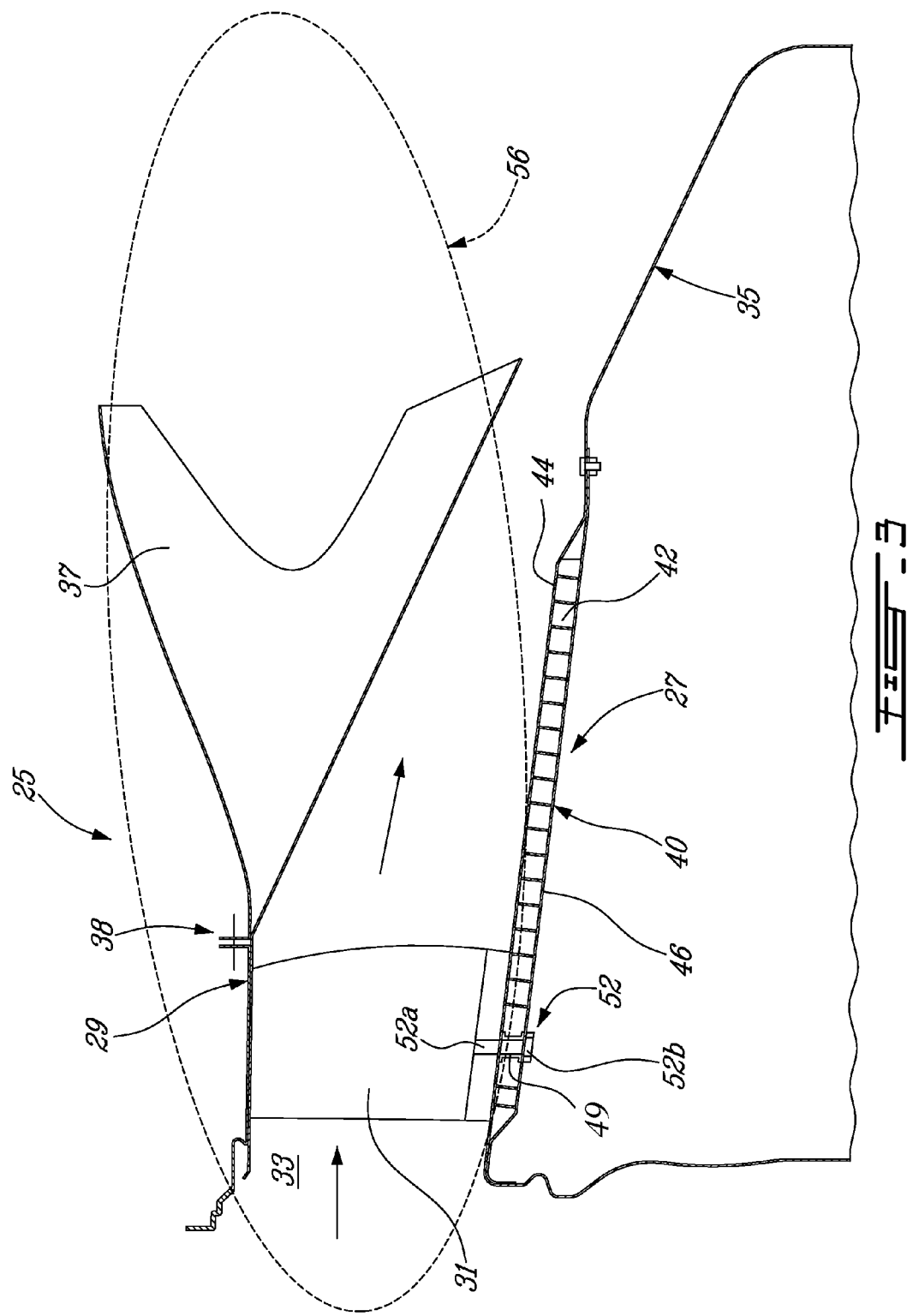
FIG. 3 is a schematic cross-section of the turbine exhaust case.

Referring to FIGS. 1 to 3, the gas turbine engine further comprises a turbine exhaust case 25 disposed immediately downstream of the last stage of low pressure turbine blades for receiving hot gases from the low pressure turbine 15 and exhausting the hot gases to the atmosphere. The turbine exhaust case 25 may comprise an annular inner shroud 27 concentrically mounted about the central axis A (FIG. 1) of the engine, an annular outer shroud 29 concentrically mounted about the central axis A of the engine and the inner shroud 27, a plurality of circumferentially spaced-apart struts 31 extending radially between the inner and outer shrouds 27, 29, thereby structurally connecting same. The struts 31 may not only serve as structural components, they may have an airfoil profile to serve as vanes for directing/straightening the incoming flow of hot gases. The struts 31 may have a hollow body to provide an internal passageway for lubrication lines and the like. As shown in FIGS. 1 and 3, a multi-lobed mixer 37 may be attached to the aft end of the outer shroud 29. As depicted at 38 in FIG. 3, a flange connection may be provided for allowing the mixer 37 to be bolted to the outer shroud 29 of the turbine exhaust case 25. A mounting flange 39 (FIG. 2) may also be provided at the front end of the outer shroud 29 for securing the turbine exhaust case 25 to the engine case 41 (FIG. 1) which, in turn, may be structurally connected to the nacelle 10 through a plurality struts 43 (FIG. 1) extending radially through the bypass passage of the engine. Referring to FIGS. 1 to 3, it may also be appreciated that a tail cone 35 may be mounted to the aft end of the inner shroud 27 of the turbine exhaust case 25. The tail cone 35 is bolted or other suitably removably connected to the inner shroud 27.

In operation, combustion gases discharged from the combustor 23 power the high and low pressure turbines 19 and 15, and are then exhausted into the annular gaspath 33 defined between the inner and outer shrouds 27, 29 of the turbine exhaust case 25. The tangential components included in the exhaust gases may be de-swirled by the struts 31 or similar de-swirling airfoil structures which may be integrated in the turbine exhaust case 25, and then the exhaust gases are discharged into the atmosphere through the mixer 37 which facilitates the mixing of the exhaust gases with the outer air flow from the bypass passage.

Referring now more specifically to FIGS. 2 and 3, it can be appreciated that acoustic panel(s) is/are integrated to the inner shroud 27. The inner shroud could be composed of a single circumferentially extending acoustic panels formed into a ring-like member. However, according to the illustrated embodiment, the inner shroud 27 is circumferentially segmented and composed of a plurality of separate/individual arcuate acoustic panels 40 assembled into a circumferentially extending band with circumferential gaps or plays 42 between adjacent panels allowing for expansion and contraction of the inner shroud 27 in response to thermally induced movement of the exhaust struts 31. An overlap or any suitable slip joint structure (not shown) may be provided along adjoining edges of the circumferentially adjacent panels 40 to provide for a circumferentially continuous smooth flow surface for the hot gases flowing axially through the exhaust turbine case 25. The individual acoustic panels 40 are structurally connected to the outer shroud 29 by the struts 31. At least one strut extends from each panel 40. The inner shroud 27 may consist of a frameless assembly of acoustic panels, the acoustic panels being structurally supported in position by the struts only. The acoustic panels 40 project axially rearwardly in a cantilever fashion from the struts 31. This allows maximizing the surface area covered by the acoustic treatment. Also, it contributes to minimizing the weight of the engine by eliminating the need for dedicated frame members for supporting the acoustic panels.

By forming the inner shroud 27 with acoustic panel(s) 40, an acoustic treatment can be applied substantially along the full axial length of the inner shroud 27 that is from a forward end of the exhaust turbine case 25 to an aft end thereof, thereby providing added sound attenuation as compared to conventional arrangements where the acoustic treatment is applied downstream of the turbine exhaust case 25 to the tail cone 35 or in other non-ducted exhaust areas. According to the illustrated embodiment, the acoustic panels 40 create the inner shroud 27 or the inner ducted wall of the turbine exhaust case 25. As shown in FIGS. 2 and 3, the radially outer surface of the panels 40 form the inner boundary flow surface of the gaspath 33 from a location upstream from the struts 31 to a location downstream thereof. As can be appreciated from FIG. 3, the acoustic panels 40 none only extend axially upstream of the mixer 37 but also axially overlap the mixer 37 to provide sound attenuation along this ducted area as well. Such an arrangement allows providing effective sound attenuation upstream of the mixing plane where the hot gases from the engine core mixes with the fan air from the bypass passage of the engine. It can also be appreciated that by so increasing the surface area of the acoustic treatment additional sound attenuation can be obtained.

Figure 4:
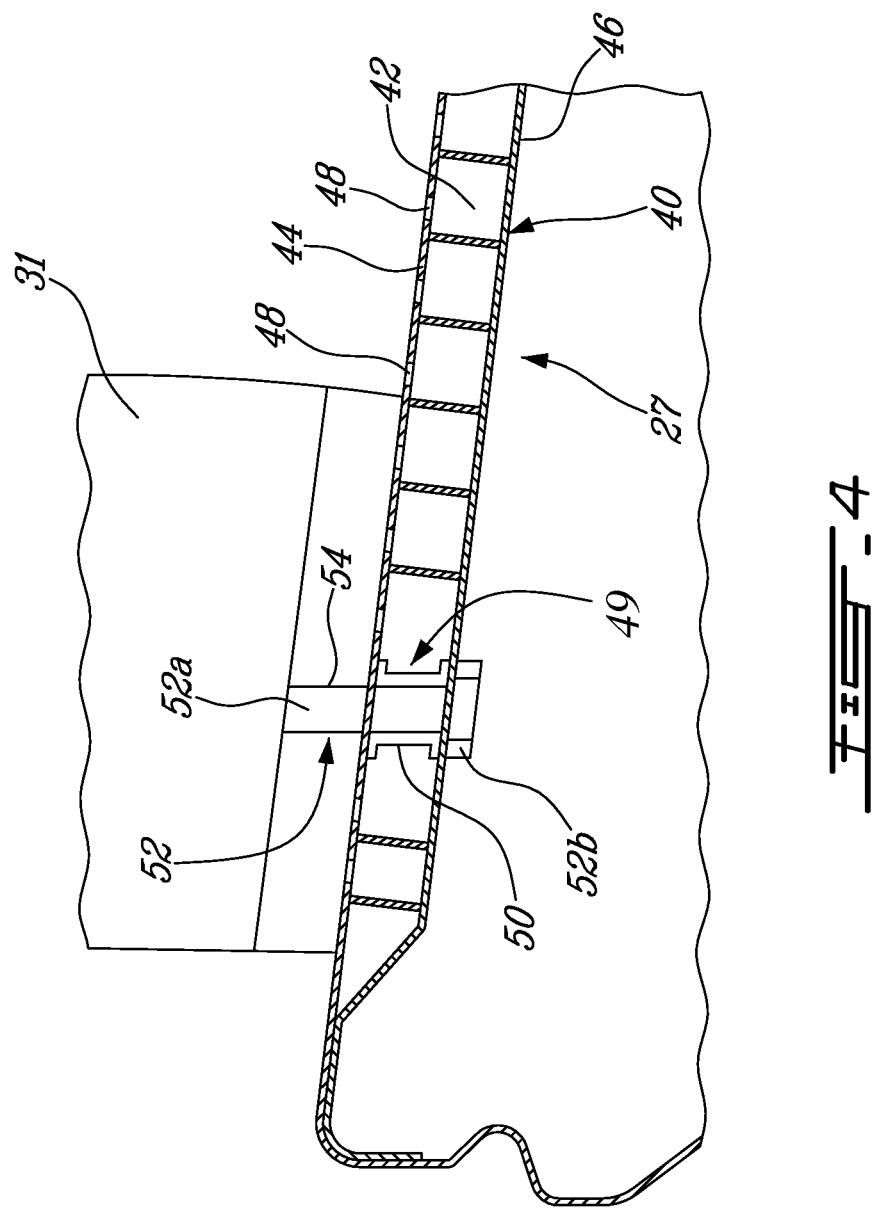
FIG. 4 is an enlarged cross-section view showing how the exhaust struts may be bolted to the acoustic panels forming the inner shroud of the turbine exhaust case.

Commercially available acoustic panels of the type having a sandwich structure comprising a core layer of cellular honeycomb like material 42 disposed between two thin metal facing sheets or skins 44, 46 may be used. As shown in FIG. 4, the cellular honeycomb material 42 has a plurality of alveolar cells. The face skin 44, i.e. the skin in contact with the hot gas flowing through the gaspath 33, is typically perforated with multiple acoustic holes 48. The density and size of acoustic holes 48 in the face skin 44 and of alveolar cells in the cellular core material 42 as well as the thickness of cellular core material 42 may be chosen by a person skilled in the art as a function of the desired acoustic performance. The back skin 46, i.e. the skin not in contact with the hot stream of gas, may be solid (i.e. non-perforated).

The radially outer end of each strut 31 may be welded or otherwise suitably attached to the outer shroud 29. According to one possible embodiment, the struts 31 and the outer shroud 29 are both made out of sheet metal and are welded together. As shown in FIGS. 3 and 4, mechanical fasteners may be used to detachably structurally mount the struts 31 to the acoustic panels 40 forming the inner shroud 27. To that end, tubular inserts 49 may be installed in corresponding holes 50 (FIG. 4) extending thicknesswise through the acoustic panels 40 for receiving a fastener adapted to be engaged in retention relationship with the radially inner end of the struts 31. According to the illustrated embodiment, each fastener comprises a bolt 52 which is inserted in the tubular insert 49 from within the inner shroud 27, the bolt 52 having a threaded shank 52a projecting radially outwardly from the radially outer surface (i.e. face skin 44) of the acoustic panel 40 for threaded engagement in a threaded hole 54 (FIG. 4) defined in a radially inner end wall of the associated strut 31. The bolt 52 is tightened until its head 52b bears firmly against a rim of the insert 49 the back skin 46 of the panel 40. At least one such fastening arrangement is provided per strut 31. According to an embodiment, more than one bolt could be used for each strut 31. Any desired number of struts may be mounted per panel. Each panel 40 is thus provided with at least one attachment point per strut. For instance, if two circumferentially spaced-apart struts 31 are to be mounted to an acoustic panel 40, at least two circumferentially spaced-apart tubular inserts 49 would be integrated to the panel 40, one insert 49 for each strut 31.

The acoustic panels 40 may be mounted to the inner radial end of the struts 31 at the end of the assembly process of the turbine exhaust case 25 to spare the acoustic panels 40 from subsequent manufacturing processes, damage and spoiling. For instance, the exhaust case 25 could be built by first forming a sheet metal ring to form the outer shroud 29. Thereafter, the radially outer end of the struts 31 could be welded to the outer shroud 29. At this stage, the mixer 37 can also be attached to the outer shroud 29. Finally, the arcuate acoustic panels 40 can be mounted to the case sub-assembly 56 (FIG. 3) formed by the outer shroud 29, the struts 31 and the mixer 37 by bolting the acoustic panels 40 to the radially inner end of the struts 31 to form the radially inner shroud 27 of the exhaust case 25. In this way, the acoustic panels 40 are less exposed to manufacturing processes which are susceptible to obstruct their acoustic holes 48. In fact, the turbine exhaust case 25 can be manufactured without substantially exposing the acoustic panels 40 to subsequent manufacturing processes. This also provides for the mounting of the struts 31 directly to the acoustic panels 40. Also, the possibility of readily removing the panels 40 of the inner shroud 27 from the struts 31 improves the ability to repair the part in service.

The above description is meant to be exemplary only, and one skilled in the art will recognize that changes may be made to the embodiments described without departing from the scope of the invention disclosed. For example, the number of struts 31 per panel 40 could vary. Also it is understood that various panel constructions are contemplated and not only the above described honeycomb sandwich material. Also the mechanical fasteners used for structurally mounting the acoustic panels to the struts of the exhaust case should not be limited to bolts. For instance, rivets could be used. Other suitable mechanical fasteners are contemplated as well. It is also understood that acoustic treatment could be applied to the outer shroud 29 as per the way described hereinbefore with respect to the inner shroud 27. Still other modifications which fall within the scope of the present invention will be apparent to those skilled in the art, in light of a review of this disclosure, and such modifications are intended to fall within the scope of the appended claims.

What is claimed is:

1. A turbine exhaust case disposed downstream of a last stage of turbine blades of a gas turbine for exhausting hot gases to the atmosphere, the engine having an axis, the exhaust case comprising a radially outer annular shroud and a radially inner annular shroud concentrically mounted about said axis and defining therebetween an annular gaspath for channeling hot gases received from the last stage of turbine blades of the engine, a plurality of circumferentially spaced-apart struts extending radially across the gaspath between the radially outer and the radially inner annular shrouds, at least one of said radially inner and outer shrouds being defined by at least one arcuate acoustic panel, said at least one arcuate acoustic panel having a radially facing surface defining a flow boundary surface of said gaspath, the at least one arcuate acoustic panel having an acoustic treatment including a core layer of cellular honeycomb like material and a plurality of acoustic holes defined in the radially facing surface defining the flow boundary surface, said at least one acoustic panel having an array of circumferentially spaced-apart fastener receiving holes extending thicknesswise therethrough, each of said fastener receiving holes being aligned with a corresponding connection hole defined in an end wall of an associated one of said struts, and a plurality of fasteners projecting radially from said fastener receiving holes of said at least one acoustic panel into said connection holes of said struts, the fasteners structurally connecting the struts to said at least one acoustic panel.

2. The turbine exhaust case defined in claim 1, wherein each said fastener includes a bolt threadably engaged into said connection hole of a corresponding one of said struts.

3. The turbine exhaust case defined in claim 1, wherein each said fastener includes a bolt having a threaded shank and a head, the head of said bolt bearing against a radially inwardly facing side of the at last one acoustic panel, the radially inner shroud being defined by said at least one acoustic panel.

4. The turbine exhaust case defined in claim 1, wherein each of said fastener receiving holes comprises a passage defined in a tubular insert integrated to said at least one acoustic panel.

5. The turbine exhaust case defined in claim 1, wherein said at least one acoustic panel comprises a plurality of circumferentially adjoining acoustic panels which collectively form the radially inner annular shroud, at least one struts being structurally connected to each of said plurality of acoustic panels.

6. The turbine exhaust case defined in claim 1, wherein said at least one acoustic panel comprises a frameless assembly of circumferentially adjoining acoustic panels, said frameless assembly of circumferentially adjoining acoustic panels forming said radially inner annular shroud, said acoustic panels being structurally supported in a ring like configuration by said struts and without any other underlying supporting structure.

7. A turbine exhaust case for disposed downstream of a last stage of turbine blades of a turbo fan engine for exhausting hot gases to the atmosphere, the engine having an axis, the exhaust case comprising a radially outer annular shroud and a radially inner annular shroud concentrically mounted about said axis and defining therebetween an annular gaspath for channeling hot gases received from the last stage of turbine blades of the engine, a plurality of circumferentially spaced-apart turbine exhaust struts extending radially across the gaspath between the radially outer and the radially inner annular shrouds, the radially inner shroud being defined by at least one arcuate acoustic panel, having an acoustic treatment including a core layer of cellular honeycomb like material, said at least one arcuate acoustic panel having a radially outwardly facing surface defining a radially inner flow boundary surface of said gaspath, said radially outwardly facing surface having a plurality of acoustic holes defined therein, said exhaust struts projecting radially outwardly from said radially outwardly facing surface of the at least one acoustic panel and being mechanically fastened at their radially inner ends to said at least one acoustic panel.

8. The turbine exhaust case defined in claim 7, wherein the exhaust struts have radially outer ends, and wherein said radially outer ends are welded to said radially outer annular shroud.

9. The turbine exhaust case defined in claim 7, wherein said at least one acoustic panel is only supported from a radially outer side thereof, the exhaust struts supporting all the weight of said at least one acoustic panel.

10. The turbine exhaust case defined in claim 7, wherein the at least one acoustic panel projects axially rearwardly from the exhaust struts in a cantilever fashion.

11. The turbine exhaust case defined in claim 7, wherein said radially inner ends of said struts each comprise a radially inwardly facing end wall defining at least one threaded hole for threading engagement with a threaded fastener extending thicknesswise through said at least one acoustic panel.

12. The turbine exhaust case defined in claim 11, wherein said threaded fastener comprises a bolt engaged with a tubular insert integrated to said at least one acoustic panel.

13. The turbine exhaust case defined in claim 12, wherein said bolt has a threaded shank projecting radially outwardly from the radially outwardly facing surface of the at least one acoustic panel.

14. A method of manufacturing a turbine exhaust case configured for mounting downstream of a last stage of turbine blades of a gas turbine engine, the method comprising: a) providing a radially outer annular shroud, b) structurally mounting a circumferential array of struts to a radially inwardly facing surface of the radially outer shroud, and then c) mechanically fastening individual acoustic panels to a radially inner end of the struts, the acoustic panels collectively forming a circumferentially segmented radially inner annular shroud, each individual acoustic panel having a radially outwardly facing surface defining a plurality of acoustic holes and a core layer of cellular honeycomb like material.

15. A method as defined in claim 14, wherein step c) comprises bolting the acoustic panels to the struts.

16. A method as defined in claim 14, wherein step c) comprises cantilevering the acoustic panels from said struts.

17. A method as defined in claim 14, wherein step c) comprises inserting a bolt from a radially inner side of the acoustic panels in each of a plurality of tubular inserts integrated to the acoustic panels, and threadably engaging the bolt in threaded hole defined in a radially inwardly facing end wall of each strut.

\* \* \* \* \*